ized Dec. 29, 1964

3,163,522
METHOD FOR THE PRODUCTION OF STEEL
Rudolf Rinesch and Rudolf Lukesch, Linz, Austria, assignors to BOT Brassert Oxygen Technik AG., Zurich, Switzerland, a company of Switzerland
No Drawing. Filed June 19, 1962, Ser. No. 203,481
Claims priority, application Austria, June 22, 1961, A 4,855/61
3 Claims. (Cl. 75—52)

Under the term "surface-blowing processes" methods for the production of steel have been known in which oxygen or a high-oxygen gas is blown onto the surface of liquid crude iron charged in a refractory-lined vessel. Surface-blowing processes are carried out in the presence of a basic slag. The refining reactions are realized partly through the slag and partly by a direct contact of the oxygen with the liquid iron bath. Crude iron contains varying amounts of accompanying elements, such as silicon, manganese, phosphorus, which liberate heat on reaction with the oxygen and raise the temperature of the bath. These favourable heat-balance conditions of the surface-blowing processes make it possible to utilize the heat generated by the combustion of the metalloids for melting additional scrap. Experience has shown that with normal contents of accompanying elements in the crude iron (up to 1.5% Si, up to 2% P, up to 3.0% Mn) it is feasible to melt scrap in an amount up to about 30 to 40% of the charge, which is highly desirable for the steel producer. The scrap is preferably added at the beginning of the refining process by charging the scrap into the crucible and subsequently introducing the liquid crude iron and slag-forming agents. In some cases, however, it may be desirable to add the scrap during the refining operation, e.g., for cooling purposes. According to known methods of working the addition of scrap during the process is a suitable measure also for accelerating the dephosphorization.

It has already been proposed to add iron ore to the melt instead of or in addition to scrap. This measure has been contemplated particularly for advancing the dephosphorization; for the addition of iron ore has two favourable effects on the slagging reaction of phosphorus: on the one hand, it facilitates the formation of a reactive lime-ferrite slag from the iron oxide added and the lime contained in the slag, and on the other hand, the added iron ore has a strong cooling effect, owing to the endothermic dissociation of the iron oxide, which is likewise favourable for entering the phosphorus into the slag.

Whereas the addition of iron ore during the refining process—as in the case of refining high-phosphorus crude iron—is a well-known and preferred measure, it has hitherto been disregarded to add iron ore to the charge at the beginning of the refining process for melting it down instead of scrap, i.e., on grounds of heat balance. The reason therefor is seen in that a reaction of the iron ore with the carbon present in the metal bath takes place only at temperatures higher than 1500° C., which range is not attained at the beginning of the refining process. Then, when this temperature is attained and exceeded in the course of the refining process, extraordinary troublesome delays in boiling result which may turn into explosion-like reactions. For these reasons, it has been impossible to utilize the heat delivered by the metalloids for melting iron ore, so that even steel works having no scrap returns, but abundant amounts of iron ore had to buy foreign scrap, which meant a considerable economical strain.

The object of the present invention is to overcome these disadvantages and difficulties. Delays in boiling in processes of refining crude iron by surface-blowing oxygen or a high-oxygen gas in which iron ore is added are prevented, according to the method of the invention, by adding a carbonaceous substance simultaneously with the iron ore. The term "carbonaceous substance" will be understood to comprise any solid carbon-containing substances, such as coke, char coal, lignite, oil, tar and the like. Preferably the carbonaceous substance is added in an amount corresponding stoichiometrically to the oxygen content of the added iron ore, provided that the accompanying elements contained in the crude iron range at the usual percentages. The carbonaceous substance and iron ore may be previously mixed, in order to provide for an even and uniform distribution.

The success of the method according to the invention is due to the fact that the reaction of the added carbonaceous substance, which is not dissolved in the iron bath, but floats in or on the slag, takes place immediately, regardless of the temperature of the melt. Thus, an evolution of gas (slight boiling) immediately sets in, and the surplus FeO is reduced at once, whereby high iron-oxide contents in the slag, which occur if no carbon is added, are avoided. This bears also metallurgical advantages, because the iron melt will take up less oxygen from the slag. Besides, the strong cooling effect which is usually caused by an addition of iron ore, is prevented by the method according to the invention.

The addition of the carbonaceous substance together with the iron ore permits an efficient control of the FeO content in the slag. If high-silicon crude iron is to be refined, less carbon has to be added than would correspond to the stoichiometric oxygen content in the iron ore, since silicon will react with the oxygen most rapidly, and a danger of boiling delays will arise only after the silicon has been consumed. To a man skilled in the art it is obvious that the amount of the carbonaceous substance added will depend on the respective percentages of accompanying elements in the crude iron, particularly on the silicon content, so that a constant boiling rate is maintained, whilst delays in boiling and violet reactions are avoided. The method according to the invention allows to conduct the process in an analogous manner to a crude-iron/scrap process, iron ore being supplied instead of scrap.

The method is illustrated more fully by the following example.

Crude iron having the following composition: 4.12% C, 1.22% Si, 1.95% Mn, 0.182% P, 0.051% S, balance iron, is to be converted to steel.

In a 50 ton crucible having a basic refractory lining 50,000 kg. crude iron having the above composition is charged at a temperature of 1230° C. 3,000 kg. lime and 100 kg. bauxite are used as slag-forming agents. 4,500 kg. iron ore assaying for 60% Fe and 11% $SiO_2$ are mixed with 300 kg. coke and added at the beginning of the blow, during the first five minutes (oxygen blast tube about 1,600 mm. above bath surface).

From the first to the fifth minutes the blow pressure is 8.5 at., subsequently 9.5 at. Duration of the heat: 14.30 minutes.

Preliminary sample: 0.04% C, 0.32% Mn, 0.014% P, 0.017% S.

Final sample: 0.05% C, 0.32% Mn, 0.015% P, 0.017% S, 0.037% Al.

What we claim is:

1. In a method of refining by top-blowing with oxygen a melt of crude iron containing oxidizable accompanying elements which generate heat upon oxidation, the step of simultaneously adding iron ore and carbonaceous substance to said melt while its temperature is less than 1500° C., the amount of the iron ore added being substantially enough to utilize the heat generated by the oxidation of said accompanying elements to melt the iron ore, and the amount of the carbonaceous substance added corresponding substantially stoichiometrically to the content of combined oxygen in the iron ore, thereby preventing delays in boiling.

2. A method as set forth in claim 1, wherein iron ore and carbonaceous substance are mixed prior to addition to said melt.

3. In a method of refining by top-blowing with oxygen a melt of crude iron containing oxidizable accompanying elements which generate heat upon oxidation, the step of simultaneously adding scrap, iron ore and carbonaceous substance to said melt while its temperature is less than 1500° C., the total amount of the scrap and iron ore added being substantially enough to utilize the heat generated by the oxidation of said accompanying elements to melt said scrap and iron ore, and the amount of the carbonaceous substance added corresponding substantially stoichiometrically to the content of combined oxygen in the iron ore, thereby preventing delays in boiling when the temperature of said melt rises above 1500° C.

References Cited by the Examiner
UNITED STATES PATENTS

| | | | |
|---|---|---|---|
| 65,830 | 6/67 | Reese | 75—51 |
| 491,498 | 2/93 | Rollet | 75—52 |
| 1,782,923 | 11/30 | Hofmann | 75—54 |
| 2,815,275 | 12/57 | Richter | 75—52 |
| 3,030,202 | 4/62 | Galocsy | 75—52 |

FOREIGN PATENTS 878,386  9/61  Great Britain.

BENJAMIN HENKIN, *Primary Examiner.*